(Model.)

O. M. ROBINSON.
Music Leaf Turner.

No. 239,062. Patented March 22, 1881.

Witnesses.
Wm. H. Mortimer
A. C. Kiskadden

Inventor
O. M. Robinson,
per
F. A. Lehmann,
Atty.

UNITED STATES PATENT OFFICE.

ORVIL M. ROBINSON, OF POULTNEY, VERMONT.

MUSIC-LEAF TURNER.

SPECIFICATION forming part of Letters Patent No. 239,062, dated March 22, 1881.

Application filed January 8, 1881. (Model.)

*To all whom it may concern:*

Be it known that I, O. M. ROBINSON, of Poultney, in the county of Rutland and State of Vermont, have invented certain new and useful Improvements in Music-Leaf Turners; and I do hereby declare the following to be a full, clear, and exact description of the invention, such as will enable others skilled in the art to which it pertains to make and use it, reference being had to the accompanying drawings, which form part of this specification.

My invention relates to an improvement in music-leaf turners; and it consists in the use of a series of arms provided with catches and springs for holding the leaves, and which are operated by spiral springs and guiding-pulleys for changing the direction of the connecting strings or wires, as will be more fully described hereinafter.

The object of my invention is to produce a cheap and simple machine for turning the leaves of the music, and one which is made so compactly as to take up very little room on the piano, melodeon, or organ.

Figure 1:
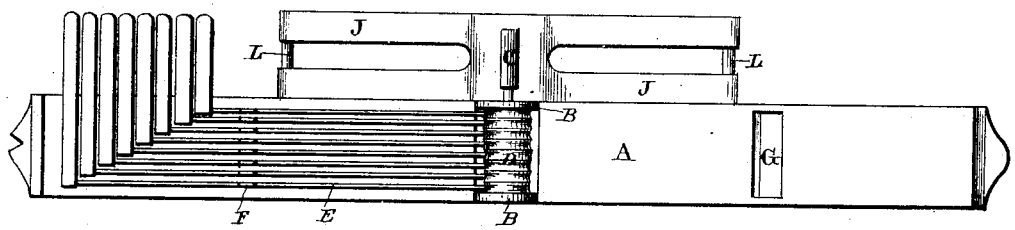
Figure 2:
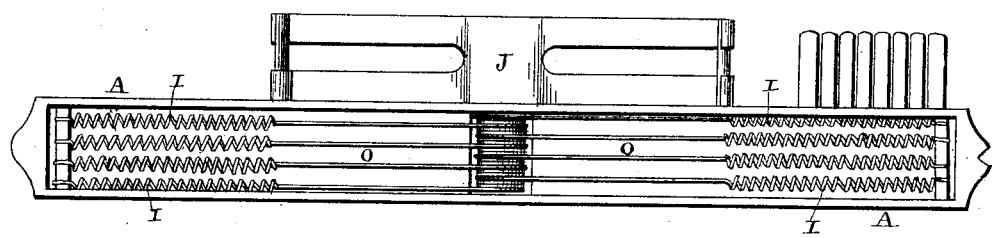
Figure 3:
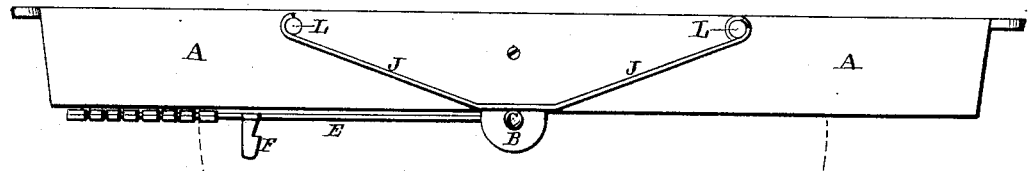
Figure 4:
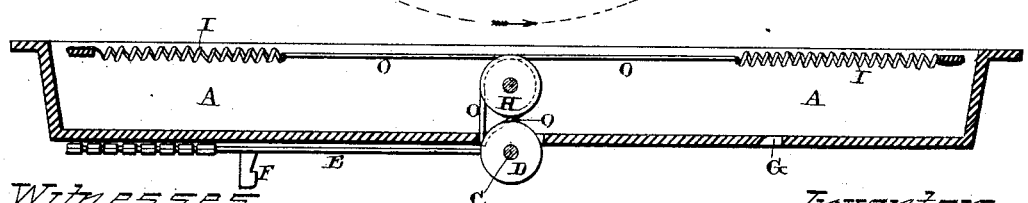

Figure 1 is a front elevation of a machine embodying my invention. Fig. 2 is a rear view of the same. Fig. 3 is a plan view of the same. Fig. 4 is a horizontal section of the same.

A represents a suitable rectangular frame, made of metal or wood, and which is designed to be attached to the musical instrument by means of a screw at one end and a button at the other, so as to be readily removable. This frame has an opening made through it at the center of its front side, and a flange, B, projecting out from its edges above and below the opening, so as to form bearings for the pin C to pass down through. Upon this pin are placed a series of grooved disks, D, from each one of which projects an arm, E, for turning the leaves of the music. Each one of these arms is provided with a spring at its outer end for catching hold of the leaf, and a catch, F. All of the catches are in a line with each other, and when the arms are turned back for the purpose of holding the leaves these catches all catch in the slot G, which is made through the front side of the frame. These catches take but a very slight hold, so that but a gentle push or pull is all that is necessary to release them.

Fastened to each one of the disks D close to the point where the arms are secured is a cord, wire, or small chain, O, one half of which cords extends straight back around the rollers H, placed directly behind the disks, while the other half of the cords is passed around the rollers from the opposite side, so as to change their direction. Each one of these cords has its rear end fastened to a spiral spring, I, one half of which is located in one end of the frame and the other half in the other. Were the pulleys not used for changing the direction of one-half of the cords, the springs could not thus be divided, and hence the frame would have to be made much wider and larger in every way. When one of the arms is swung around from the left-hand side toward the right the cord O is pulled upon by the disk so as to draw it outward, and this pull is transmitted to the spiral spring fastened to the cord, and thus a constant tension is exerted on the arm, so as to pull it back as soon as it is released.

Upon the top of the frame is secured the flat bent spring J, which has its two ends fastened to the two vertical pins L, and which bears at its center against the head of the pivotal pin C. In between this spring and the head of the pin is placed the music-book to be held. While thus held a number of its leaves, corresponding to the number of arms attached to the frame, have their lower edges inserted between the springs on the ends of the arms, and then the arms are turned over toward the right until their catches catch in the slot G, where they are held. When the musician is ready to turn a leaf he has only to give the arm fastened to the outer sheet a gentle pull, when the tension of the spiral spring causes the arm to fly over and hold the leaf in its place.

If so desired, any suitable device may be applied to the frame for operating the arms, and these devices may be operated by treadles or any other suitable means, in the usual manner.

Having thus described my invention, I claim—

1. In a leaf-turner, the combination of the arms provided with the springs on their ends and the catches F with the frame A, having a slot, G, made through it for the catches to catch in, substantially as shown.

2. The combination of the disk having the arms attached thereto and a series of pulleys placed back of the disks with the cords and spiral springs, whereby one half of the springs can be placed in one end of the frame, and the other half placed in the other end, substantially as described.

In testimony that I claim the foregoing I have hereunto set my hand and seal this 31st day of December, 1880.

ORVIL M. ROBINSON. [L. S.]

Witnesses:
JOSEPH P. KENNEDY,
B. R. PARKHURST.